(12) United States Patent
Palmer

(10) Patent No.: US 10,977,752 B2
(45) Date of Patent: Apr. 13, 2021

(54) SYSTEM TO MARKET REAL ESTATE AND RELATED METHODS

(71) Applicant: Robert Palmer, Lake Mary, FL (US)

(72) Inventor: Robert Palmer, Lake Mary, FL (US)

(*) Notice: Subject to any disclaimer, the term of this patent is extended or adjusted under 35 U.S.C. 154(b) by 576 days.

(21) Appl. No.: 15/862,034

(22) Filed: Jan. 4, 2018

(65) Prior Publication Data

US 2018/0189904 A1 Jul. 5, 2018

Related U.S. Application Data

(60) Provisional application No. 62/442,106, filed on Jan. 4, 2017.

(51) Int. Cl.

| | |
|---|---|
| *G06Q 50/16* | (2012.01) |
| *G09F 1/10* | (2006.01) |
| *G09F 5/02* | (2006.01) |
| *A47G 1/06* | (2006.01) |
| *G09F 7/00* | (2006.01) |

(52) U.S. Cl.
CPC .......... *G06Q 50/16* (2013.01); *A47G 1/0638* (2013.01); *G09F 1/10* (2013.01); *G09F 5/02* (2013.01); *G09F 7/00* (2013.01)

(58) Field of Classification Search
CPC ................. G09F 7/00; G09F 1/10; G09F 5/02
USPC ............................... 206/486, 488, 489, 477
See application file for complete search history.

(56) References Cited

U.S. PATENT DOCUMENTS

| | | | | |
|---|---|---|---|---|
| 5,799,782 A | * | 9/1998 | Gelardi | G11B 33/0405 206/1.5 |
| 5,915,548 A | * | 6/1999 | Sasaki | G11B 33/0433 206/307.1 |
| 6,092,054 A | | 7/2000 | Tackbary et al. | |
| 6,167,469 A | | 12/2000 | Safai et al. | |
| 6,230,885 B1 | * | 5/2001 | Rochelo | A45C 11/182 206/1.5 |
| 2002/0054331 A1 | | 5/2002 | Takenobu et al. | |
| 2004/0158488 A1 | * | 8/2004 | Johnson | G06Q 30/0269 705/14.58 |
| 2006/0136308 A1 | * | 6/2006 | Ratchford | G06Q 30/0641 705/26.5 |
| 2017/0277984 A1 | * | 9/2017 | Person | G06F 40/103 |

* cited by examiner

*Primary Examiner* — Julie M Shanker
(74) *Attorney, Agent, or Firm* — Matthew G. Mckinney; Allen, Dyer et al.

(57) ABSTRACT

A method to market real estate includes providing a graphical user interface to a user for installation on a remote computer, receiving a street address at a server for a particular piece of real estate from the remote computer, and receiving digital photographs at the server of the particular piece of real estate. The server includes a microprocessor and a memory that stores user preferences for a marketing format and the street address, where the microprocessor formats the digital photographs in accordance with the user preferences and the marketing format, and generates a plurality of physical marketing items for the particular piece of real estate in accordance with the user preferences. The plurality of physical marketing items includes at least one of a door hangtag, a postcard, a thank you card, and a sign. The method also includes assembling the plurality of physical marketing items into a display box.

20 Claims, 5 Drawing Sheets

SYSTEM TO MARKET REAL ESTATE AND RELATED METHODS

RELATED APPLICATION

The present invention is related to U.S. Provisional Patent Application Ser. No. 62/442,106 filed Jan. 4, 2017, the entire contents of which are incorporated herein by reference.

FIELD

The present invention relates to the field of real estate, and, more particularly, to a system to market real estate and related methods.

BACKGROUND

Real estate marketing and sales is facilitated by real estate brokers and their agents. Traditional means of carrying out real estate marketing are replete with inefficiency and other shortcomings and limitations. These shortcomings include the inability of the broker to distinguish his or her services from competing brokers. This is particularly important when a broker is attempting to secure a real estate listing from the seller.

The seller is of course looking for a broker who is most likely to bring a buyer that is willing to pay the highest price for the real estate. The seller will make this decision to select a particular broker based, in part, on the seller's perception of the broker's marketing and sales presentation and success.

Accordingly, a marketing system and method is needed where a broker can generate a unique marketing presentation quickly and efficiently to show to a seller and potential client in order to persuade the seller to retain the services of the broker to list the real estate.

SUMMARY

In view of the foregoing background, it is therefore an object of the present invention to provide a system and method to market real estate that can be used to help secure a real estate listing. The method includes providing a graphical user interface to a user for installation on a remote computer, receiving a street address at a server for a particular piece of real estate from the remote computer, and receiving digital photographs at the server of the particular piece of real estate.

The server includes a microprocessor and a memory that stores user preferences for a marketing format and the street address. The microprocessor is configured to format the digital photographs in accordance with the user preferences and the marketing format, and generate a plurality of physical marketing items for the particular piece of real estate in accordance with the user preferences using a printer.

The plurality of physical marketing items may include at least one of a door hangtag, a postcard, a thank you card, and a sign. The method also includes assembling the plurality of physical marketing items into a display box that can be shown to a potential client.

In another embodiment, a system to market real estate includes a graphical user interface configured to be installed on a remote computer. The system also includes a server having a microprocessor and a memory that stores user preferences for a marketing format and the street address. The microprocessor is configured to format the digital photographs in accordance with the user preferences and the marketing format, and generate a plurality of physical marketing items for the particular piece of real estate using a printer in accordance with the user preferences. The plurality of physical marketing items may include at least one of a door hangtag, a postcard, a thank you card, and a sign. In addition, the system includes a display box configured to carry the plurality of physical marketing items.

One advantage of a particular illustrative embodiment of the invention is that a real estate broker or agent can show the display box containing all the marketing items to the potential client in order to persuade the potential client to hire the broker. For example, once the client sees the marketing items that have been personalized for that particular piece of property owned by the seller, this may greatly increase the chances that the seller will retain the broker.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
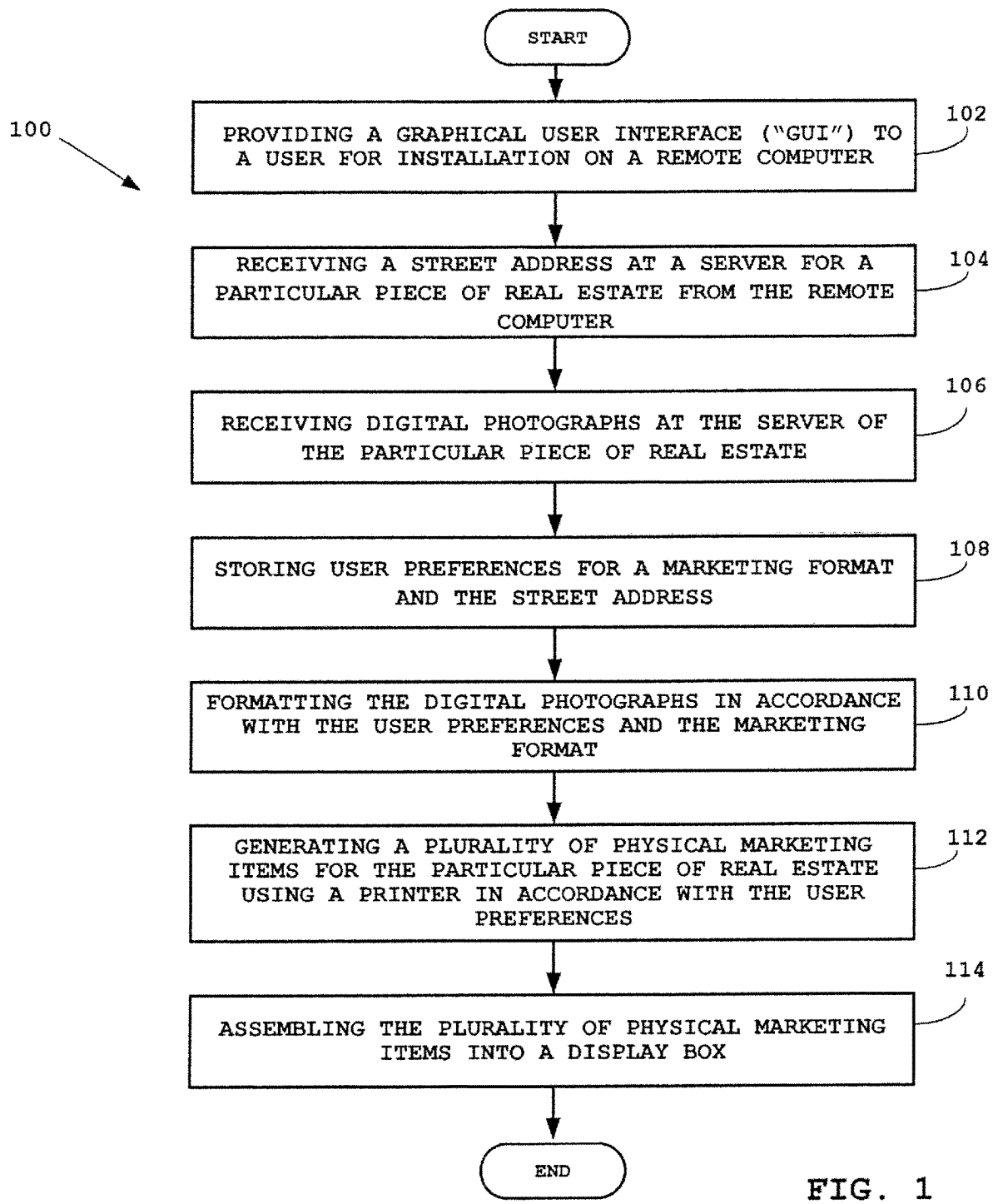
FIG. 1 is a flow diagram of a particular illustrative embodiment of a method to market real estate.

Referring initially to FIG. 1, a method to market real estate is generally designated 100. The method begins with providing a graphical user interface ("GUI") to a user for installation on a remote computer, at 102. Moving to 104, the method includes receiving a street address at a server for a particular piece of real estate from the remote computer.

In addition, the method includes, at 106, receiving digital photographs at the server of the particular piece of real estate. The method also includes storing user preferences for a marketing format and the street address, at 108.

The method includes formatting the digital photographs in accordance with the user preferences and the marketing format, at 110. At 112, the method includes generating a plurality of physical marketing items for the particular piece of real estate using a printer in accordance with the user preferences, and assembling the plurality of physical marketing items into a display box, at 114.

Figure 2:
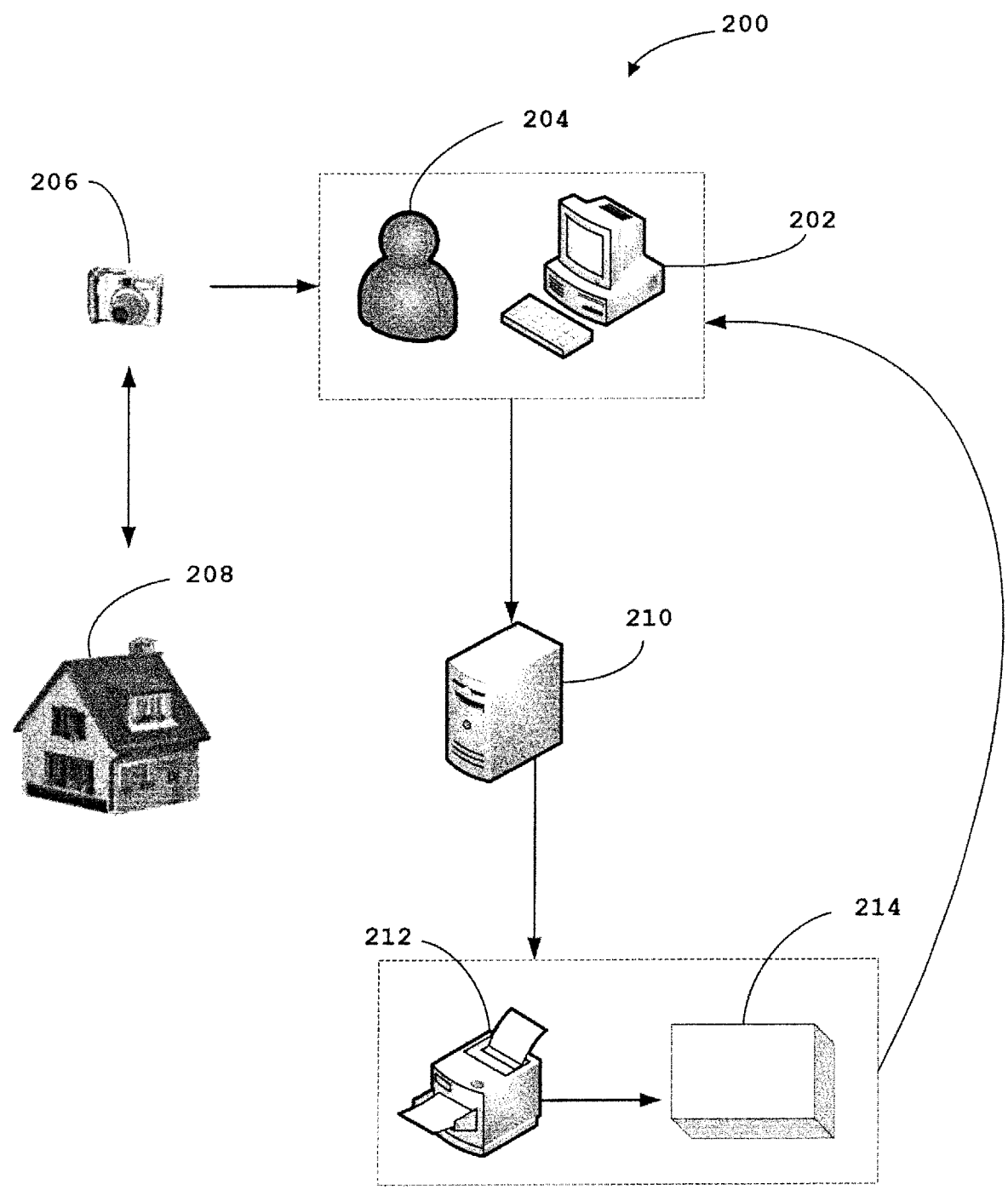
FIG. 2 is a diagram of a particular illustrative embodiment of a system to market real estate.

Referring to FIG. 2, a system to market real estate is shown and designated 200. The system 200 includes a remote computer 202 in communication with a server 210. A user 204, such as a real estate broker, uses a GUI installed on the remote computer 202 in order to enter a street address for a particular piece of real estate and transmit to the server 210. The remote computer 202 may be connected to the server over the Internet, intranet, or a wireless communication system, for example.

The piece of real estate is one that a seller is considering listing with a real estate broker. For example, the piece of real estate could be a residential home 208. The user 204 can upload digital photographs of the home 208 to the remote computer 202 that can be used in marketing the real estate. This can include exterior pictures as well as interior pictures of the home taken with a camera 206 and uploaded to the remote computer 202.

The server 210 may store the street address, the digital pictures, and any other information associated with the piece of real estate that may be used in marketing. The server 210 is configured to format the digital photographs and other information (e.g., a textual description, tax information, past listing information, etc.) in accordance with user preferences and the marketing format.

Subsequently, a printer 212 in communication with the server 210 generates different marketing items for the particular piece of real estate. The server may also store the formatted digital pictures and other information on a removable storage device. The marketing items may include door hangtags, postcards, thank you cards, business cards, and various signs, for example. These marketing items are then placed in a marketing display box 214 that can be delivered to the user 204 for use in a marketing presentation to a seller and potential client.

Figure 3:
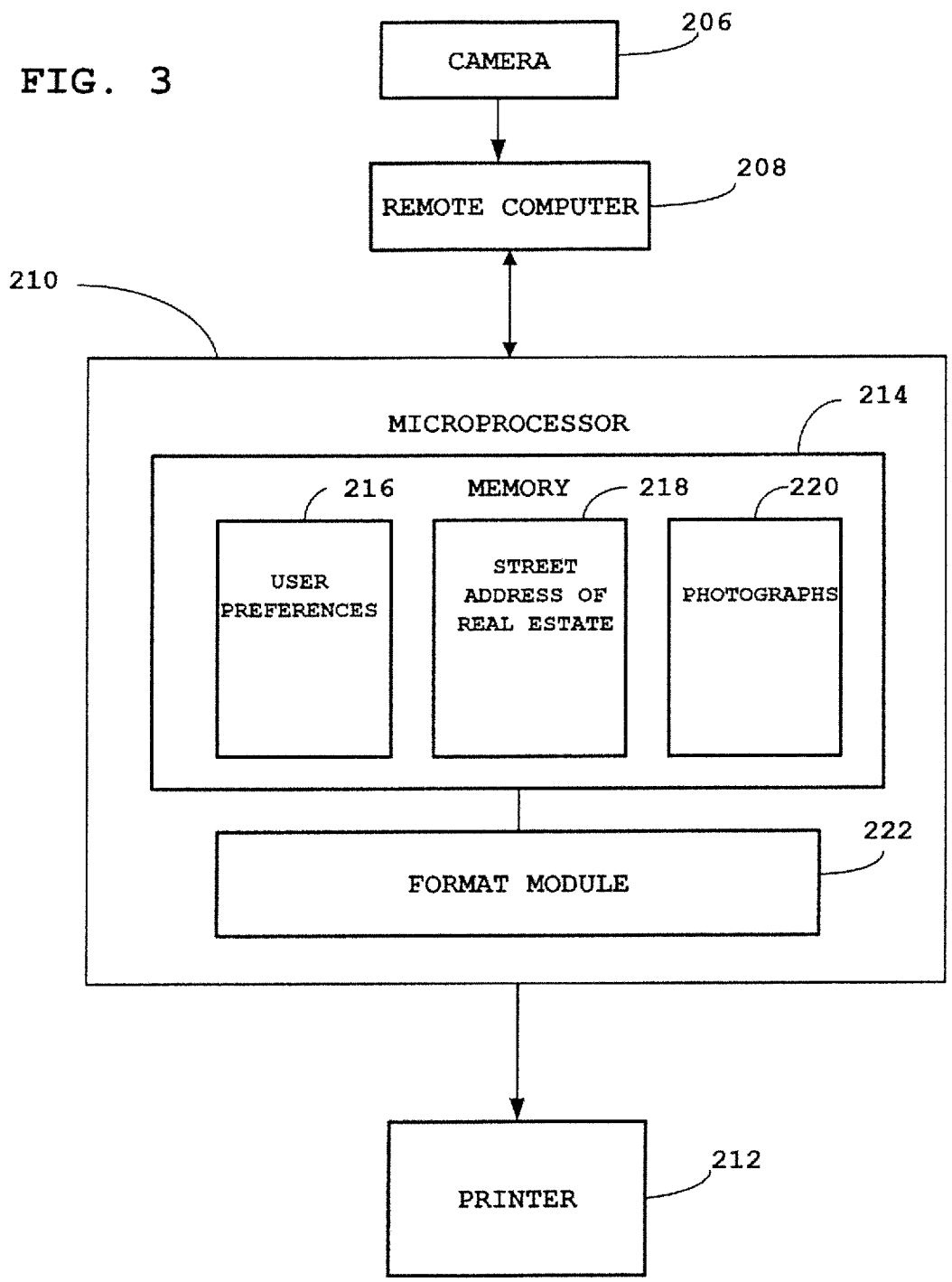
FIG. 3 is a general diagram of a system incorporating a microprocessor and a memory in which the system and method of FIGS. 1 and 2 to market real estate may be used.

FIG. 3 is a general diagram of the server 210, which includes a microprocessor and a memory 214. The memory 214 is used to store a user's preferences 216, street address of the particular piece of real estate 218, photographs 220, and any other information related to the real estate. A format module 222 having an algorithm is executed by the microprocessor in order to format the photographs and any other information related to the real estate into the desired marketing format. The server 210 transmits the formatted photographs and other information to a printer 212 that generates the physical marketing items in accordance with the user preferences, which can then be placed into a display box 214.

Figure 4:
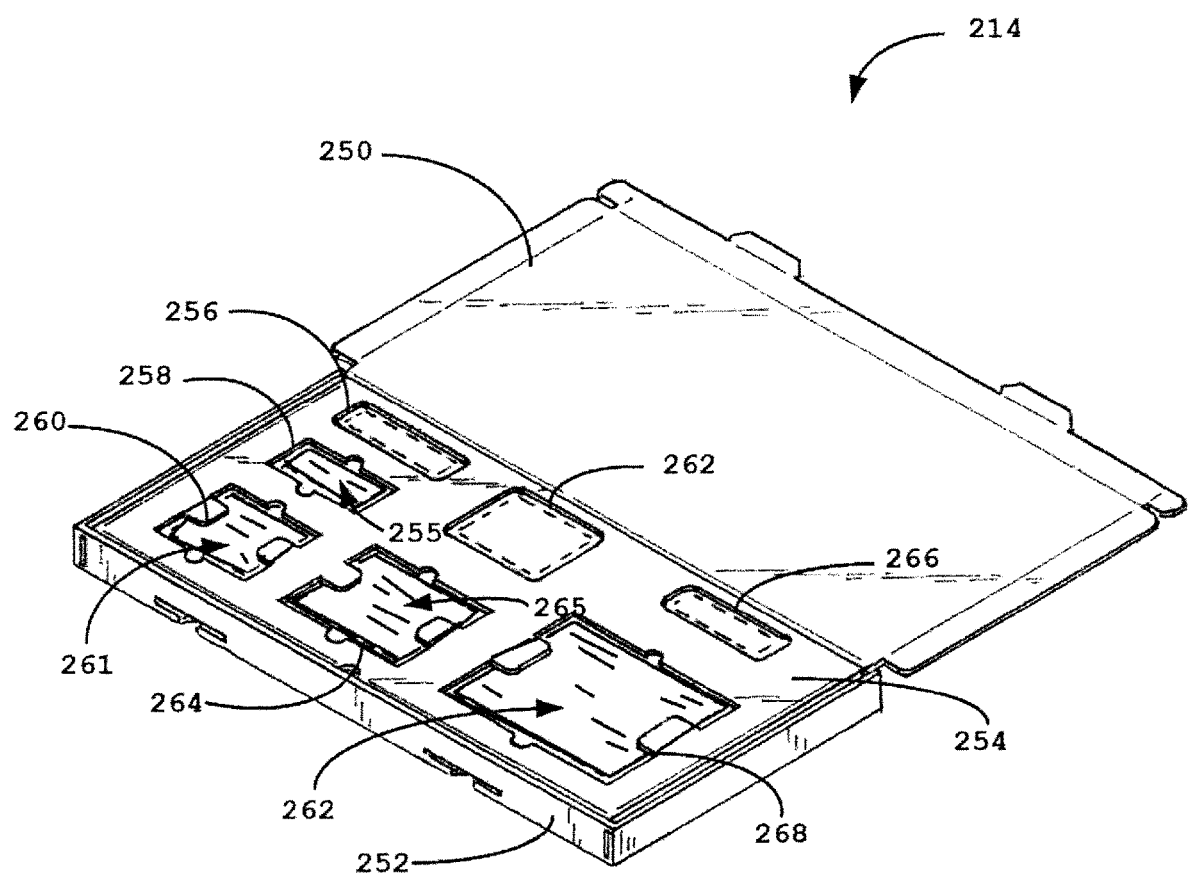
FIG. 4 is a particular illustrative embodiment of a marketing display box that may be used with the system and method to market real estate.
Figure 5:
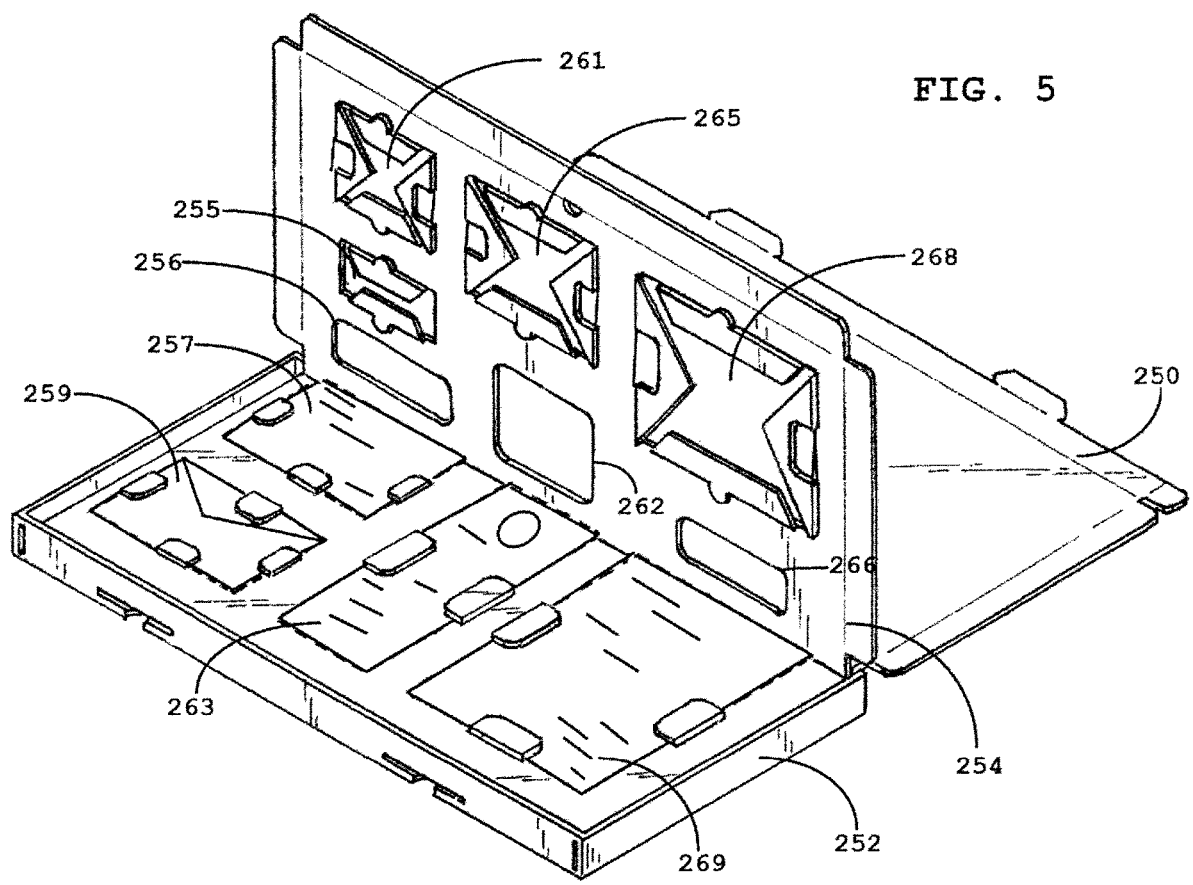
FIG. 5 is the marketing display box of FIG. 4 with a hinged panel lifted showing marketing items.

Referring now to FIGS. 4 and 5, the display box 214 includes a lid 250 and a base 252. A hinged panel 254 includes a number of cut-outs and compartments that are used to hold and/or display the various marketing items.

For example, under cut-out 256 is a number of post-cards 257 that are visible, compartment 258 is for holding business cards 255, and compartment 260 is for larger sized cards 261. In addition, under cut-out 262 is door hangers 263 that are visible through the cut-out 262, and compartment 264 is sized and configured to hold thank-you cards 265. Also, in this particular example, under cut-out 266 is large sign 269, and compartment 268 is sized and configured to hold medium signs 270.

All of these marketing items have been personalized with the photographs of the real estate and relevant information, including contact information for the broker. Accordingly, the broker can present the display box 214 to the seller, which shows all the marketing items personalized for the seller's real estate (e.g., home), which is persuasive and distinguishes the broker from other brokers that may be also attempting to get the listing. The particular marketing items described herein are exemplary only, and should not be considered limiting, as any combination of marketing items are considered within the purview of the invention.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined herein.

That which is claimed is:

1. A method to market real estate comprising:
   providing a graphical user interface ("GUI") to a user for installation on a remote computer;
   receiving a street address at a server for a particular piece of real estate from the remote computer;
   receiving digital photographs at the server of the particular piece of real estate, the server comprising a microprocessor and a memory that stores user preferences for a marketing format and the street address, wherein the microprocessor executes an algorithm that
   formats the digital photographs in accordance with the user preferences and the marketing format, and generates a plurality of physical marketing items for the particular piece of real estate using a printer in accordance with the user preferences; and assembling the plurality of physical marketing items into a display box;

wherein the display box comprises a hinged lid connected along an edge of the base, a hinged panel connected along the edge of the base between the hinged lid and the lower planar surface and configured to be raised and lowered, a plurality of compartments formed in the hinged panel to hold and to display a first set of physical marketing items, and a plurality of cut-outs formed in the hinged panel to view a second set of physical marketing items that are secured to the lower planar surface and under the hinged panel and are configured to be accessed with the hinged panel is raised.

2. The method of claim 1, further comprising delivering the display box containing the plurality of physical marketing items to the user.

3. The method of claim 1, wherein the remote computer is a wireless device.

4. The method of claim 1, wherein the plurality of physical marketing items comprise at least one of a door hangtag, a postcard, a thank you card, and a sign.

5. The method of claim 1, further comprising printing contact information of the user on the plurality of physical marketing items, wherein the user is a listing agent.

6. The method of claim 1, wherein assembling the plurality of physical marketing items into the display box comprises placing the marketing items into separate compartments within the box and folding tabs back over a portion thereof.

7. The method of claim 5, wherein the contact information includes a property identification number that identifies the property.

8. A system to market real estate comprising:
   a graphical user interface ("GUI") configured to be installed on a remote computer;
   a server comprising a microprocessor and a memory that stores user preferences for a marketing format and the street address, the microprocessor configured to
      format the digital photographs in accordance with the user preferences and the marketing format, and
      generate a plurality of physical marketing items for the particular piece of real estate using a printer in accordance with the user preferences; and
   a display box configured to carry the plurality of physical marketing items;
   wherein the display box comprises a hinged lid connected along an edge of the base, a hinged panel connected along the edge of the base between the hinged lid and the lower planar surface and configured to be raised and lowered, a plurality of compartments formed in the hinged panel to hold and to display a first set of physical marketing items, and a plurality of cut-outs formed in the hinged panel to view a second set of physical marketing items that are secured to the lower planar surface and under the hinged panel and are configured to be accessed with the hinged panel is raised.

9. The system of claim 8, wherein the remote computer is a wireless device.

10. The system of claim 8, wherein the plurality of physical marketing items comprise at least one of a door hangtag, a postcard, a thank you card, and a sign.

11. The system of claim 8, wherein the display box comprises a base having a hinged lid that is configured to swing between an open position and a closed position.

12. The system of claim 11, wherein the display box comprises a hinged panel between the hinged lid and the base, the hinged panel comprises a plurality of compartments configured for holding physical marketing items.

13. The system of claim 12, wherein the plurality of compartments each comprise a pair of opposing tabs along a top periphery of a respective compartment that fold back over a portion of a respective physical marketing item placed therein.

14. The system of claim 12, wherein the plurality of compartments comprise a plurality of support tabs that extend inwardly from a bottom periphery of the respective compartment in order to support the respective physical marketing item therein.

15. The system of claim 12, wherein the hinged panel comprises a plurality of cut-outs configured to view the physical marketing items under the hinged panel.

16. The system of claim 12, wherein each of the compartments comprises a sidewall that extends downward from a top periphery to the bottom periphery of the respective compartment to form a depth to accept a stack of physical marketing items therein.

17. A display box for real estate marketing, the display box comprising:
   a base having a lower planar surface and a sidewall extending upwards from a periphery thereof to form a container;
   a hinged lid connected along an edge of the base;
   a hinged panel connected along the edge of the base and spaced above and apart from the lower planar surface of the base between the hinged lid and the lower planar surface and configured to be raised and lowered;
   a plurality of compartments formed in the hinged panel to hold and to display a first set of physical marketing items so that the first set of physical marketing items do not fall out when the hinged panel is raised and lowered; and
   a plurality of cut-outs formed in the hinged panel to view a second set of physical marketing items that are secured to the lower planar surface and under the hinged panel and are configured to be accessed with the hinged panel is raised.

18. The display box of claim 17, wherein the hinged panel having a shape and size to the hinged lid.

19. The display box of claim 18, wherein the plurality of compartments each comprise a at least one tab along a top periphery of a respective compartment that folds back over a portion of a respective physical marketing item placed therein.

20. The display box of claim 19, wherein the plurality of compartments comprise a plurality of support tabs that extend inwardly from a bottom periphery of the respective compartment in order to support the respective physical marketing item therein.

* * * * *